United States Patent
Grudzinski et al.

(10) Patent No.: US 10,094,159 B2
(45) Date of Patent: Oct. 9, 2018

(54) POWER CLOSURE PANEL SYSTEM PERFORMANCE OPTIMIZER

(71) Applicant: FORD GLOBAL TECHNOLOGIES, LLC, Dearborn, MI (US)

(72) Inventors: Gregory James Grudzinski, Perrysburg, OH (US); Greg Alan Conner, Ann Arbor, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/162,996

(22) Filed: May 24, 2016

(65) Prior Publication Data

US 2017/0342758 A1 Nov. 30, 2017

(51) Int. Cl.
*E05F 15/71* (2015.01)
*E05F 15/77* (2015.01)
(Continued)

(52) U.S. Cl.
CPC .............. *E05F 15/616* (2015.01); *B60J 5/00* (2013.01); *B62D 25/10* (2013.01);
(Continued)

(58) Field of Classification Search
CPC ..... E05F 15/616; E05F 1/1091; E05F 15/622; E05F 15/71; E05Y 2201/434;
(Continued)

(56) References Cited

U.S. PATENT DOCUMENTS 6,516,567 B1 * 2/2003 Stone ................... E05F 15/622
296/55
6,719,356 B2 4/2004 Cleland et al.
(Continued)

FOREIGN PATENT DOCUMENTS

DE 102006049544 A1 4/2008
DE 102006057889 A1 6/2008
(Continued)

OTHER PUBLICATIONS

English Machine Translation of DE102006057889A1.
(Continued)

*Primary Examiner* — D Glenn Dayoan
*Assistant Examiner* — Melissa A Black
(74) *Attorney, Agent, or Firm* — Jason Rogers; King & Schickli PLLC

(57) ABSTRACT

A power optimizer system for power closure panels includes a closure panel power actuator system comprising at least a motor operatively connected to a lift-assist member and a closure panel counterbalancing member. A controller is configured at least to determine an optimal electrical current draw for the power actuator system according to one or more inputs relating at least to a vehicle ambient temperature and grade. One or more sensors are provided for providing the one or more inputs. The controller may also further be configured to receive a vehicle battery voltage condition input for calculating the optimum electrical current draw consistent with the environmental conditions to efficiently control the power actuator system motor. Methods of modeling/optimizing the appropriate electrical current draw for power closure systems operating in varying voltage, temperature and grade conditions relative to a vehicle, or other similar mechanisms are also described.

16 Claims, 2 Drawing Sheets

(51) Int. Cl.
*B60J 5/00* (2006.01)
*B62D 25/10* (2006.01)
*E05F 15/616* (2015.01)
*B62D 33/027* (2006.01)
*H02P 3/06* (2006.01)
*E05F 1/10* (2006.01)
*E05F 15/622* (2015.01)
*G07C 9/00* (2006.01)

(52) U.S. Cl.
CPC ........ *B62D 33/0273* (2013.01); *E05F 1/1091* (2013.01); *E05F 15/622* (2015.01); *E05F 15/71* (2015.01); *H02P 3/06* (2013.01); *E05Y 2201/434* (2013.01); *E05Y 2201/706* (2013.01); *E05Y 2400/30* (2013.01); *E05Y 2400/36* (2013.01); *E05Y 2400/44* (2013.01); *E05Y 2400/45* (2013.01); *E05Y 2400/612* (2013.01); *E05Y 2800/404* (2013.01); *E05Y 2800/414* (2013.01); *E05Y 2900/546* (2013.01); *G07C 9/00007* (2013.01); *Y02T 10/84* (2013.01)

(58) Field of Classification Search
CPC ........... E05Y 2201/706; E05Y 2400/30; E05Y 2400/44; E05Y 2900/546; E05Y 2400/36; E05Y 2400/45; E05Y 2400/612; E05Y 2800/404; E05Y 2800/414; B62D 33/0273; B62D 25/10; B60J 5/00; H02P 3/06; Y02T 10/84
See application file for complete search history.

(56) References Cited

U.S. PATENT DOCUMENTS

| | | |
|---|---|---|
| 6,755,458 B1 | 6/2004 | Oberheide |
| 7,055,885 B2 | 6/2006 | Ishihara et al. |
| 8,428,828 B2 | 4/2013 | Serban et al. |
| 2002/0180269 A1 | 12/2002 | Dalakuras et al. |
| 2004/0090083 A1 | 5/2004 | Greuel et al. |
| 2004/0124662 A1 | 7/2004 | Cleland et al. |
| 2005/0168010 A1 | 8/2005 | Cleland et al. |
| 2005/0264029 A1 | 12/2005 | Bodner |
| 2006/0181108 A1* | 8/2006 | Cleland .................. E05F 15/63 296/146.4 |
| 2015/0096233 A1 | 4/2015 | Kojima et al. |
| 2015/0284983 A1 | 10/2015 | Conner et al. |

FOREIGN PATENT DOCUMENTS

| | | |
|---|---|---|
| DE | 102007006336 A1 | 8/2008 |
| DE | 102008022870 B3 | 6/2009 |
| DE | 102009043037 A1 | 4/2011 |

OTHER PUBLICATIONS

English Machine Translation of DE102009043037.
English Machine Translation of DE102006049544.
English Machine Translation of DE102008022870.
English Machine Translation of DE102007006336.

* cited by examiner

POWER CLOSURE PANEL SYSTEM PERFORMANCE OPTIMIZER

TECHNICAL FIELD

This disclosure relates generally to power closure panel systems for vehicles. More particularly, the disclosure relates to a performance optimizer for a power closure panel, wherein the system reacts to conditions of grade and/or temperature extremes to design and/or modify operation and speed of a power actuator and lift-assist mechanism. By the described system, excessive electrical current draw of the power actuator/lift-assist mechanism can be anticipated due to sensor inputs, and the current draw can be minimized, refining performance for longer component life and faster product development.

BACKGROUND

It is known to provide vehicles with powered closure panels such as liftgates, decklids, side-doors, tailgates, moveable glass, hoods, tonneau covers, and others. The power-assisted closure panels may be operated by a number of mechanisms, including without intending any limitation key fob switches, dash panel switches, liftgate switches, motion sensors, voice-command sensors, associated with the closure panels, and others. Typical power controlled closure panels include a power actuator such as a motor and gearing providing sufficient torque to translate the closure panel between an open and a closed configuration. Other conventional power controlled systems include pneumatic cylinders or hydraulic systems having motor-driven fluid pumps, and unpowered mechanical assist components that work in conjunction with a standalone powered motor or actuator.

It is also known to provide lift-assist mechanisms for power controlled closure panels. Such lift assist mechanisms include torsion bars, torsion springs, air spring cylinders, tension springs, counterbalance struts, and others. Lift assist mechanisms reduce the load on the power actuator used to translate the closure panel between the open and the closed configuration.

Still more, it is known to provide programmable power-assisted closure panels. As examples, a height to which a power closure panel such as a decklid or liftgate may be pre-programmed or predetermined, to avoid having the panel strike an overlying low surface such as a parking garage roof or the like. Moreover, it is known to provide a "stop and hold" function whereby the power closure panel may be stopped manually or automatically such as by a sensor to avoid contacting an obstacle during an opening or closing operation. A representative system providing such a "stop and hold" function is described in U.S. Pat. No. 7,547,058, the entirety of the disclosure of which is incorporated herein by reference.

It is known that extremes of temperature and grade (i.e., a nose-up or nose-down orientation of a vehicle or the angle at which a vehicle is oriented relative to a horizontal plane) affect performance of power closure panels. In such conditions, the torque required for the power assist mechanism increases, and therefore the electrical current draw required by the power actuator likewise increases. For example, when a vehicle is positioned on level ground and/or at normal ambient temperature, a power controlled mechanism must apply a certain amount of opening/closing torque or force and braking to translate the closure panel between an open and a closed configuration. On a grade whereby the vehicle is nose-down, the closure panel must be pulled "uphill" in order to close the panel, and an increased amount of torque or force is required. On a grade whereby the vehicle is nose-up, additional dynamic braking or force is required to prevent the closure panel from overextending during opening. At low temperatures, electrical systems become more efficient and therefore can be operated at a reduced electrical current draw compared to higher temperatures.

For programmable power-assisted closure panel mechanisms, the potential for extremes of temperature and grade must be factored into the programming, i.e. the programming must be configured to compensate for such potential extremes of grade and/or temperature. Conventional programmable power-assisted closure panels must be programmed by trial and error, and attempt to meet all conditions of voltage, temperature, grade, load on gate (for example, snow) using a single performance sensor calibration by way of controlling speed of operation of the lift assist mechanism, for example a strut. Such conventional systems cannot automatically accommodate variations in operating conditions, for example extremes of voltage, temperature, grade, load on gate, etc., which significantly adversely affects the torque required of the power mechanisms and therefore the electrical current draw required for the power actuator to operate the closure panel. A generalized approach to operating a power closure system must ordinarily use current that would be higher than required as these systems have not had the benefit of being customized for the specific conditions of operation, adversely affecting component life.

To solve this and other problems, the present disclosure relates to a performance optimizing system for a power closure panel. The system is configured to adapt to conditions of voltage, temperature and grade extremes, and reacts to those conditions by altering the speed of the lift assist mechanism, by adjusting the power required to deliver optimized voltage and current that controls the closure panel opening/closing speed to achieve efficient function despite extreme conditions. Such an intelligent system, having the environmental input knowledge, would allow for implementation of for example, a SNOW LOAD mode, or other specific conditions where special operating performance parameters are required.

SUMMARY

In accordance with the purposes and benefits described herein, in one aspect of the disclosure a power optimizer system for a closure panel is described, comprising a closure panel power actuator system including at least a motor operatively connected to a lift member. A closure panel counterbalancing member may further be included. A closure panel power actuator system controller is provided, configured at least to determine an optimal electrical current draw for the power actuator system according to one or more inputs relating at least to a vehicle voltage, ambient temperature and grade. One or more sensors for providing the one or more inputs relating at least to the vehicle voltage, ambient temperature and grade are provided.

In embodiments, the one or more sensors are disposed in or on the vehicle and/or remotely from the vehicle. In embodiments, the controller may further be configured to receive a vehicle interior/exterior temperature, vehicle and/or closure panel grade, and battery voltage state/level input prior to providing the determined optimum electrical current draw to the power actuator system motor and optionally other auxiliary components, such as a closure cinching latching mechanism or power window.

In embodiments, the lift-assist members can be standalone, or one or more of a spring-actuated strut, a torsion bar, a torsion spring, and a gas/mechanical spring strut. The counterbalancing member may be one or more of a spring-actuated strut, a torsion bar, a gas/mechanical spring strut, or other powered actuator(s) that may contain an inter-stop valve, or a mechanical stop device, to help achieve counterbalanced throughout the swing of the closure panel. The closure panel may be one of a liftgate, a decklid, a tonneau cover, a hood, a door, a moveable glass panel, and a tailgate.

In another aspect, a method for optimizing electrical current draw of a power closure system for a vehicle is described, comprising providing a closure panel power actuator system comprising at least one motor operatively connected to or stand-alone from a lift-assist member and a counterbalancing member and a controller configured at least to determine an optimal electrical current draw for the power actuator system according to one or more inputs relating at least to a vehicle voltage, ambient temperature and grade. Next, the determined optimum electrical current draw is provided to the power actuator system motor by a module operatively associated with the controller. The method includes providing one or more sensors for providing the one or more inputs relating at least to a vehicle voltage, ambient temperature, and grade. The sensors may be disposed in or on the vehicle or the controller, or may be disposed remotely from the vehicle, for example a hand-held device which communicates with the controller by wired or wireless means.

In embodiments, the module controls the power actuator system, via pulse width modulation. In embodiments, the method may further include a step of, by the controller, receiving a vehicle battery voltage, temperature and grade determination input prior to the providing the optimum electrical current draw to the power actuator system motor.

In the following description, there are shown and described embodiments of the disclosed power closure panel, performance optimizing systems and methods. As it should be realized, the systems and methods are capable of other, different embodiments and their several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed power closure panel performance optimizing systems and methods, and together with the description serve to explain certain principles thereof. In the drawing.

Reference will now be made in detail to embodiments of the disclosed power closure panel performance optimizing systems and methods, examples of which are illustrated in the accompanying drawing figures.

DETAILED DESCRIPTION

Preliminarily, the disclosed power closure panel performance optimizing systems and methods are described herein primarily in the context of a power controlled vehicle liftgate. However, it will readily be appreciated that the systems and methods are equally applicable to any power closure panel, such as a decklid, tonneau cover, tailgate, moving glass panel and others. Therefore, this portion of the disclosure shall not be taken as limiting.

Figure 1:
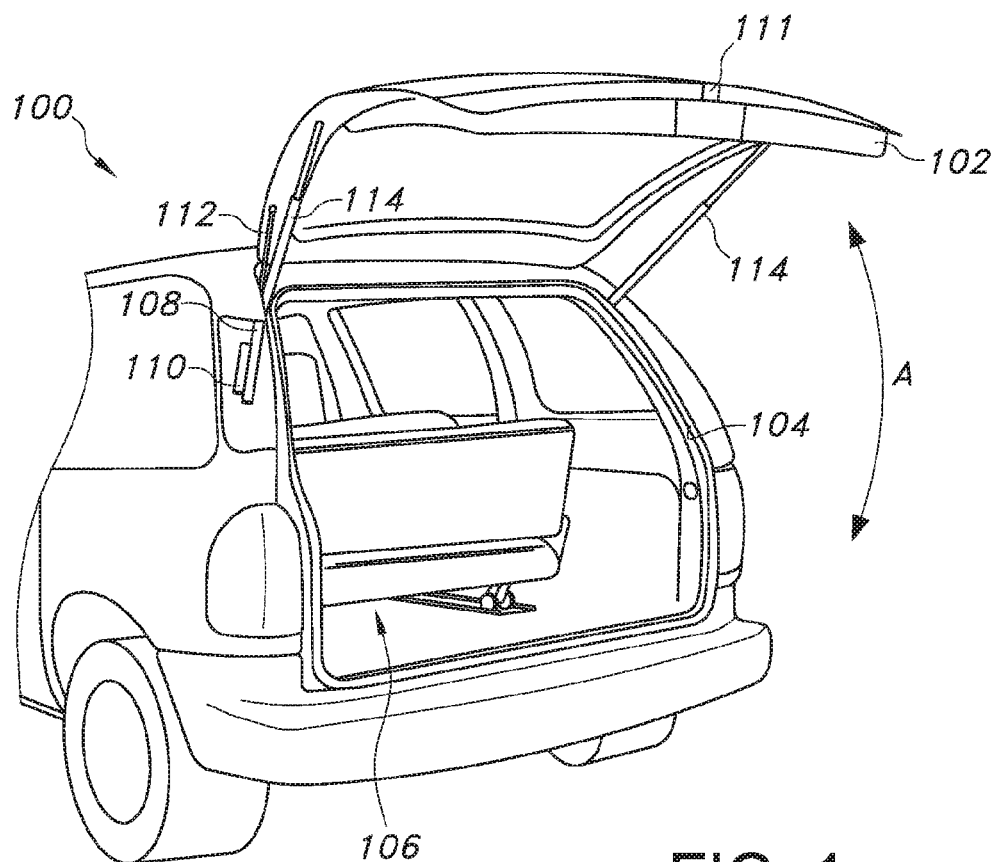
FIG. 1 depicts a vehicle including a counterbalanced power-assisted liftgate.

As set forth above and with reference to FIG. 1, it is known to provide a vehicle 100 including a hinged liftgate 102 that engages a vehicle door frame 104 and latch (not shown) in a closed position and which raises to an open position as shown in FIG. 1 to allow access to a portion of the vehicle interior such as a cargo area 106.

A power actuator system 108 includes a motor 110 that actuates to translate the liftgate 102 between the open position shown in FIG. 1 and a closed position (see arrow A). The vehicle 100 may further include a motorized cinching striker or latch 111 for engaging a cooperating door frame latch or striker (not shown). A lift assist mechanism is included in the depicted embodiment, comprising a power strut 112 and one or more spring or gas operated counterbalance struts 114, or alternatively or in addition one or more, motor-operated spring counterbalanced struts, in the same relative position. As is known, the power strut 112 is operatively associated with the motor 110 and rotates the liftgate 102 about hinged attachment points between the open and closed positions. The counterbalance strut(s) 114 serve to hold or balance the liftgate 102 between the open and closed positions, thus reducing the torque and electrical current draw required of the motor 110 to open and close the liftgate.

As will be appreciated, the disclosed power closure panel performance optimizing systems and methods are equally applicable to other power controlled closure systems, for example dual powered systems (not shown) including a pair of power struts in addition to or instead of one or more counterbalance struts 114, or one or more motor-operated spring counterbalance struts, in the same relative position. While as shown the motor 110 is external to the power strut 112, it is also known to provide a motor internal to a linear power strut 112 or a counterbalance strut 114. Likewise, use of other lift assist mechanisms is contemplated, including without intending any limitation, powered systems, torsion springs, torsion bars, mechanical spring struts, gas/mechanical spring struts, and others. Use of the disclosed power closure panel performance optimizing systems and methods with any such alternative power controlled closure systems is contemplated.

Figure 2:
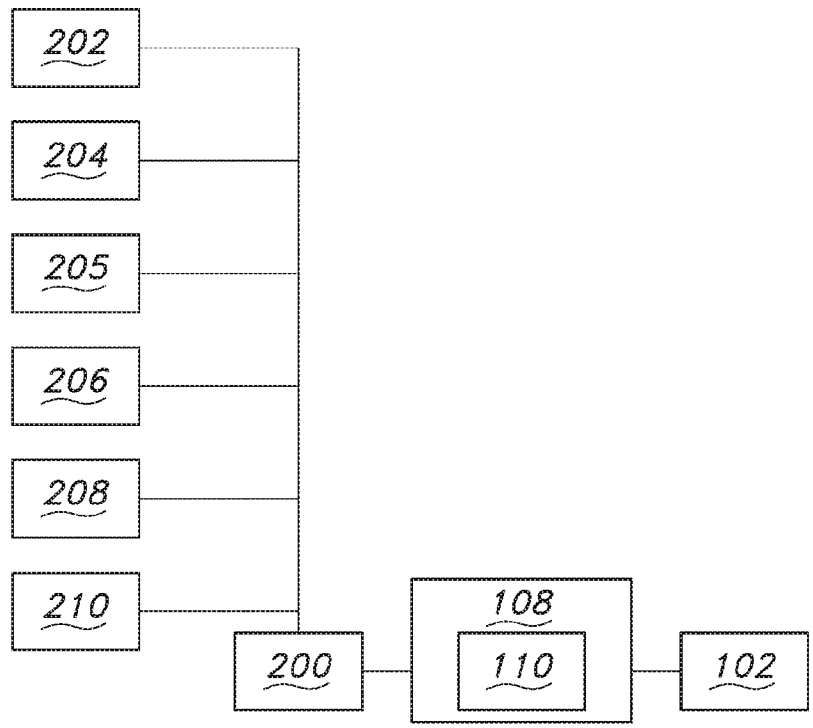
FIG. 2 depicts a controller system for the counterbalanced power-assisted liftgate of FIG. 1.

As shown in FIG. 2, a controller 200 is operatively connected to the power actuator system 108, and controls a supply of electrical current to the motor 110. The controller 200 may be dedicated to controlling the power actuator system 108, or may be part of another vehicle 100 system. The controller 200 is configured to receive a variety of inputs from one or more sensors associated with the vehicle 100 and from other vehicle systems. In an embodiment, the controller 200 receives inputs from at least one or more temperature sensors 202 and one or more vehicle grade sensors 204. In other embodiments, remote provision of inputs is contemplated, for example by way of remote sources 205 such as satellite or GPS systems providing temperature, weather, elevation, location/region, etc. inputs. Suitable temperature sensors 202, vehicle grade sensors 204, and remote sources 205 include without intending any limitation dedicated temperature sensors and accelerometer-based tilt sensors of known design, data from which is pulled over the vehicle controller area network (LIN) (CAN) bus. In other embodiments, a gyro-temperature sensor of known design is provided which provides both ambient temperature and grade data. In yet other embodiments, temperature (interior and/or exterior to the vehicle) and vehicle tilt sensors associated with an engine control unit (ECU) board are used. In still other embodiments, input of remotely sourced data is contemplated, including remotely sourced ambient temperature data from remote sources 205.

In other embodiments, the controller 200 also receives inputs from one or more of a battery voltage sensor 206, a closure panel programmable height system 208, and a motor pulse width modulation (PWM) module 210.

Figure 3:
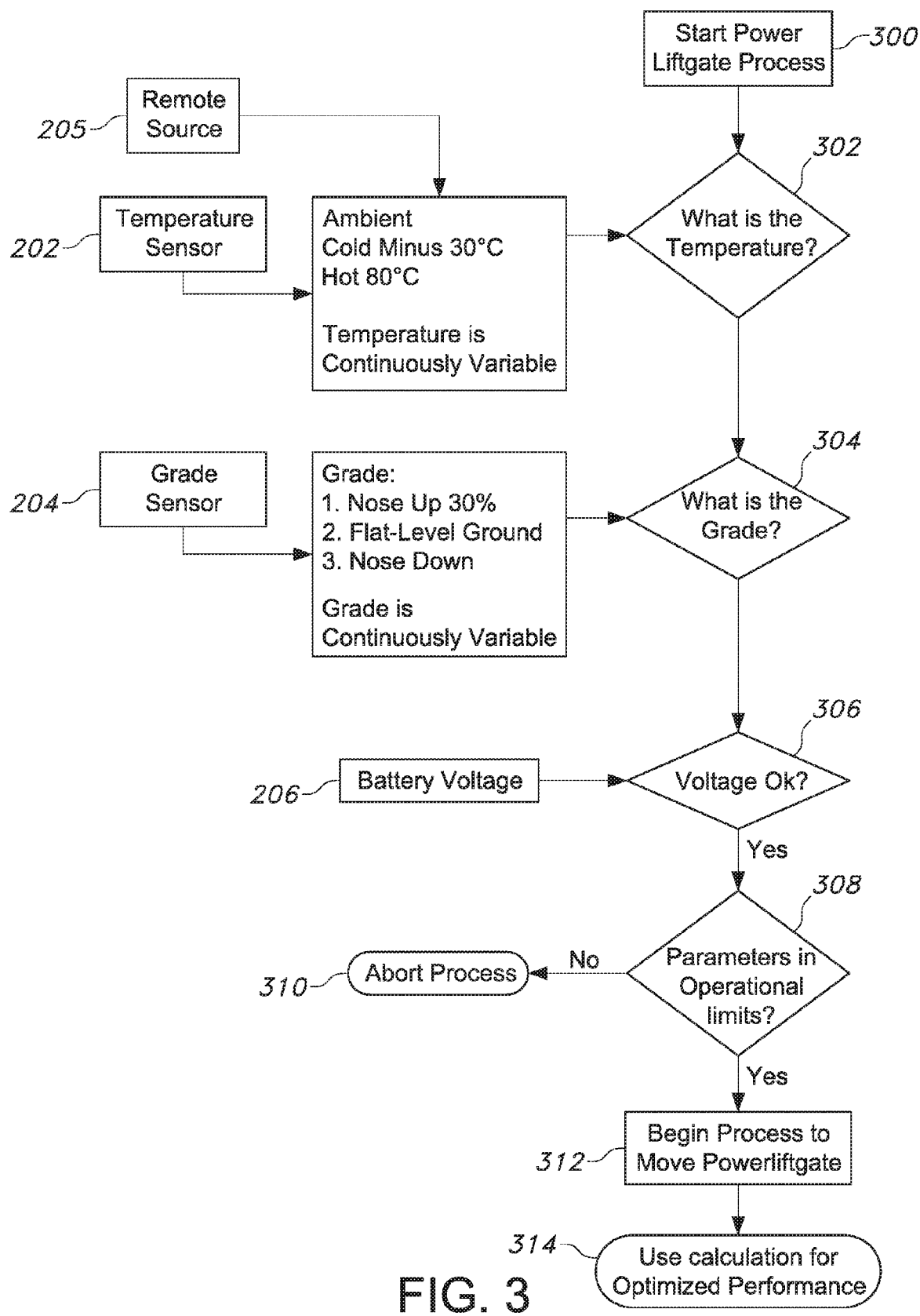
FIG. 3 depicts in flow chart form a control scheme for the controller system of FIG. 2.

The controller 200 utilizes the above-described inputs to continuously control the behavior and performance of the power actuator system 108/motor 110 in order to control electrical current draw by the power actuator system. This is illustrated in flow chart form in FIG. 3. As shown, in step 300 a process of translating a liftgate 102 between an open and closed configuration is initiated. At step 302, the controller 200 receives temperature data from a temperature sensor 202 and/or a remote source 205. In one embodiment, the controller 200 modifies the behavior of the power actuator system 108 according to whether the temperature is ambient, extreme cold (in an embodiment, 30° C. or less), or extreme heat (80° C. or more). In this embodiment, temperature is a continuous variable.

At step 304, the controller 200 receives vehicle grade data from a grade sensor 204. In one embodiment, the controller 200 modifies the behavior of the power actuator system 108 according to whether the vehicle 100 is on level ground, i.e. substantially parallel to a horizontal plane, in a "nose-up" orientation of +30% or more from the horizontal plane, or in a "nose-down" orientation of −30% or more from the horizontal plane. In this embodiment, vehicle grade is a continuous variable.

Optionally, at step 306 the controller 200 receives vehicle battery voltage data from a voltage sensor 206, and determines whether the voltage is within pre-defined operational limits (step 308). If not, at step 310 the process is terminated and optionally a signal is sent to a user such as the vehicle 100 driver indicating that the battery voltage is insufficient to operate the power actuator system 108. If so, the process of translating the closure panel is initiated (step 312). At step 314, the controller 200 calculates optimum operating parameters for the power actuator system 108 according to at least the temperature and vehicle grade inputs described above, and optionally for other of the various inputs described above.

In one embodiment, the controller 200 is configured to apply a multiple linear regression analysis to solve equations with multiple continuously variable inputs and multiple continuously variable responses simultaneously. By incorporating such multiple inputs/multiple responses, a multiple response optimizer routine is provided allowing determination of optimal electrical current draw by components of the power actuator system 108, such as the motor 110 and/or the striker/latch 111 motor, according to multiple inputs as described above. As described, the inputs include at least temperature and vehicle grade, but may also include one or more of battery voltage, predetermined closure panel opening height, motor pulse width modulation, and others. The responses may include one or more of electrical current draw, closure panel speed of opening/closing, and obstacle forces.

A representative analysis for a multiple response optimizer routine for determining optimal operation of a module controlled, or micro-computer controlled closure panel power actuator system will now be discussed. The analysis determines interactions between various factors and uses those interactions to optimize component useful lifetime, by reducing electrical current draw on main components such as the motor 110. This is because as is known, high electrical current draw causes electro-mechanical system wear and premature component failure due to over-current conditions, heat, and induced mechanical wear and tear.

The sample analyzed presented in Table 1 below includes a range of temperature inputs of (−30° C. versus 20° C.), vehicle grade (30% decline versus 30% incline), and vehicle battery voltage (10 V versus 12 V). Other analyses shown below compare temperature inputs of 50° C. and vehicle battery voltage of 16 V.

TABLE 1

A Model description produced from a Multiple Linear Regression analysis for determination of optimum power actuator system operation.

| TERM | Coef | SE Coef | T | P-Value |
|---|---|---|---|---|
| Constant | 105.415 | .0340 | 310.29 | 0.000 |
| Temperature | | | | |
| −30° C. | −34.1704 | 0.4805 | −71.12 | 0.000 |
| 20° C. | 7.3407 | 0.4805 | 15.28 | 0.000 |
| Grade | | | | |
| 30% Decline | 21.7407 | 0.4805 | 45.25 | 0.000 |
| 30% Incline | −19.2148 | 0.4805 | −39.99 | 0.000 |
| Voltage (@ source) | | | | |
| 10 V | −7.1037 | 0.4805 | −14.79 | 0.000 |
| 12 V | −3.3704 | 0.4805 | −7.01 | 0.000 |

S=3.94734, R–Sq=98.91%, R–Sq (adjusted)=98.64%, wherein R–Sq (adjusted) is a Coefficient of Determination, i.e. a value showing how much of an observed variation in responses is explained by the main factors of temperature, vehicle grade, and voltage (100%=maximum); a coefficient with a P-value of less than 0.05 is significant, Coef=Coefficient; SE=Standard error; and S=Estimate of Standard Deviation.

For a temperature of −30° C. and a 30% decline, the calculation is:

95.4 Force(N)=105.4−34.17×(−30° C.)+21.7×(30% decline)−7.103×(10V),

This can be correlated to the Speed or Amps as they are directly proportional.

For a temperature of 20° C. and a 30% incline, the calculation is:

97 Force(N)=105.4+7.34×(20° C.)−19.21×(30% incline)−3.37×(12V),

Force is correlated with Speed, and Amps.

Thus, as can be seen by the described analyses the optimal electrical current draw for particular environmental conditions may be determined by the controller 200 and supplied to the power actuator system 108 according to various inputs of temperature, vehicle grade, and battery voltage. This determined electrical current draw may be supplied to the power actuator system 108 by any suitable means, for example by a motor 110 driven by a pulse width modulation module.

The General Linear Regression Model for this process is very unique as the P-Value for the Interaction Groupings under the "Source" column (see Table 2 below) shows that overall of the groups are considered significant, that is they have none zero coefficient. This means that these Factors can be used to calculate the predicted value with high degree certainty. As shown, the Coefficient of Determination is 98%, and so the model explains 98% of the variation in the measured data. Because more predictors can be used, the analysis is highly sensitive to these variables and so ultimately more accurate control can be exerted over the electro-mechanical components. This ultimately allows very quickly fine tuning the processes for longer component lifetime due to less unnecessary electrical wear and tear. Advantageously, the model eliminates certain variables (50° C., Level Ground, and battery voltage of 16 V) further simplifying the number of Process Factors levels that may be needed to accurately develop the model for similar power actuator systems. As will be appreciated, this model may be used to develop a suitable lookup table of optimal electrical current draws for particular environmental conditions for accessing by the controller 200.

TABLE 2

General Linear Model.

General Linear Model: 8N-Closing f, 6N-Closing f versus Temperature, Grade, . . .

| Factor | Type | Levels | Values |
|---|---|---|---|
| Temperature | fixed | 3 | −30° C., 20° C., 50° C. |
| Grade | fixed | 3 | Decline, Incline, Level |
| Voltage (@ supply) | fixed | 3 | 10 V, 12 V, 16 V |

Analysis of Variance for 8N-Closing force 1°
Analysis of Variance for 8N-Closing force 1° (N), using Adjusted SS for Tests

| Source | DF | Seq SS | Adj SS | Adj NS | P |
|---|---|---|---|---|---|
| Temperature | 2 | 68035.1 | 68035.1 | 34017.6 | 802.72 |
| Grade | 2 | 33798.3 | 33798.3 | 10999.3 | 398.70 |
| Voltage (@ supply) | 2 | 18727.2 | 18727.2 | 9363.6 | 220.96 |
| Temperature*Grade | 4 | 9758.7 | 9758.7 | 2439.7 | 57.57 |
| Temperature*Voltage (@ supply) | 4 | 2097.8 | 2097.8 | 524.4 | 12.37 |
| Grade*Voltage (@ supply) | 4 | 728.9 | 728.9 | 152.2 | 4.30 |
| Temperature*Grade*Voltage (@ supply) | 8 | 7200.6 | 7200.6 | 900.1 | 21.24 |
| Error | 108 | 4576.8 | 4576.8 | 42.4 | |
| Total | 136 | 144923.3 | | | |

| Source | P |
|---|---|
| Temperature | 0.000 |
| Grade | 0.000 |
| Voltage (@ supply) | 0.000 |
| Temperature*Grade | 0.000 |
| Temperature*Voltage (@ supply) | 0.000 |
| Grade*Voltage (@ supply) | 0.000 |
| Temperature*Grade*Voltage (@ supply) | 0.003 |
| Error | 0.000 |
| Total | |

Table 3 is a typical Analysis of Variance ANOVA Table showing the number of key terms or predictors, Coefficients, Standard Deviation of the Coefficients, T-Value and P-Values. The low P-Values indicate that the Coefficients are non-zero, and are significant in calculating the equations above, for Force, Speed, or Amperage.

TABLE 3

Representative ANOVA analysis.
Linear Model:
S = 3.94734 R-Sq = 98.91% R-Sq (adj) = 98.64%

| Term | Coef | SE Coef | T | P |
|---|---|---|---|---|
| Constant | 105.415 | 0.340 | 310.29 | 0.000 |
| Temperature | | | | |
| −30° C. | −34.1704 | 0.4805 | −71.12 | 0.000 |
| 20° C. | 7.3407 | 0.4805 | 15.28 | 0.000 |
| Grade | | | | |
| Decline | 21.7407 | 0.4805 | −45.25 | 0.000 |
| Incline | −19.2140 | 0.4805 | −39.99 | 0.000 |
| Voltage (@ source) | | | | |
| 10 V | −7.1037 | 0.4805 | −14.79 | 0.000 |
| 12 V | −3.3704 | 0.4805 | −7.01 | 0.000 |
| Temperature*Grade | | | | |
| −30° C. Decline | 3.1481 | 0.6795 | 4.63 | 0.000 |
| −30° C. Incline | 0.2370 | 0.6795 | 0.35 | 0.728 |
| 20° C. Decline | −1.2963 | 0.6795 | −1.91 | 0.059 |
| 20° C. Incline | 7.2593 | 0.6795 | 10.68 | 0.000 |
| Temperature*Voltage (@ source) | | | | |
| −30° C. 30 V | −4.4074 | 0.6795 | −6.49 | 0.000 |
| −30° C. 32 V | −5.8074 | 0.6795 | −8.55 | 0.000 |
| 20° C. 20 V | 2.5401 | 0.6795 | 3.75 | 0.000 |
| 20° C. 32 V | 2.7481 | 0.6795 | 4.04 | 0.000 |
| Grade*Voltage (@ source) | | | | |
| Decline 10 V | −6.5185 | 0.6795 | −9.59 | 0.000 |
| Decline 12 V | −4.0519 | 0.6795 | −5.96 | 0.000 |
| Incline 10 V | 3.7037 | 0.6795 | 5.45 | 0.000 |
| Incline 12 V | 1.3704 | 0.6795 | 2.02 | 0.046 |
| Temperature*Grade*Voltage (@ source) | | | | |
| −30° C. Decline 10 V | −8.5037 | 0.9609 | −8.85 | 0.000 |
| −30° C. Decline 12 V | −11.1037 | 0.9609 | −11.56 | 0.000 |
| −30° C. Incline 10 V | 0.1407 | 0.9609 | 0.15 | 0.884 |
| −30° C. Incline 12 V | 3.3407 | 0.9609 | 3.46 | 0.001 |
| 20° C. Decline 10 V | 4.4741 | 0.9609 | 4.66 | 0.000 |

Again, the Model has eliminated the high temperature of 50 C, the Grade of Level Ground, and the high Voltage of 16V. This means that these parameters can ultimately be eliminated from the analysis, and future parameter-defining experimental designs, further reducing the time, effort and resources in the Control-Model development process.

Table 4 shows the impact of Temperature, Grade and voltage alone, and also shows the interactions of Temperature*Grade, Temperature*Voltage, and Grade*Voltage. Analysis of these Interactions allows the developer to include a combination of factor interactions whose effects cannot be known by intuition. Being able to determine these interactions and their impact on the accuracy of the Model is what ultimately give this process its predictability and usefulness in developing a deeper understanding of the variable and the process being controlled.

TABLE 4

Analysis of Interactions.
Least Squares Means

| | | 8N-Closing force 1° (N) | |
|---|---|---|---|
| | | Mean | SE Mean |
| Temperature | | | |
| −30° C. | | 80.36 | 0.9704 |
| 20° C. | | 119.49 | 0.9704 |
| 50° C. | | 133.38 | 0.9704 |
| Grade | | | |
| Decline | | 190.96 | 0.9704 |
| Incline | | 92.27 | 0.9704 |
| Level | | 109.98 | 0.9704 |
| Voltage (@ supply) | | | |
| 10 V | | 99.67 | 0.9704 |
| 12 V | | 106.27 | 0.9704 |
| 16 V | | 127.29 | 0.9704 |
| Temperature*Grade | | | |
| −30° C. | Decline | 115.60 | 1.6808 |
| −30° C. | Incline | 55.20 | 1.6808 |
| −30° C. | Level | 70.27 | 1.6608 |
| 20° C. | Decline | 134.07 | 1.6808 |
| 20° C. | Incline | 107.67 | 1.6808 |
| 20° C. | Level | 116.73 | 1.6808 |
| 50° C. | Decline | 143.27 | 1.6808 |
| 50° C. | Incline | 113.93 | 1.6808 |
| 50° C. | Level | 142.93 | 1.6808 |
| Temperature*Voltage (@ source) | | | |
| −30° C. | 10 V | 67.27 | 1.6808 |
| −30° C. | 12 V | 71.40 | 1.6808 |
| −30° C. | 16 V | 102.40 | 1.6808 |
| 20° C. | 10 V | 105.13 | 1.6808 |
| 20° C. | 12 V | 116.67 | 1.6808 |
| 20° C. | 16 V | 136.67 | 1.6808 |
| 50° C. | 10 V | 126.60 | 1.6808 |
| 50° C. | 12 V | 130.73 | 1.6808 |
| 50° C. | 16 V | 142.80 | 1.6808 |
| Grade*Voltage (@ source) | | | |
| Decline 10 V | | 118.47 | 1.6808 |
| Decline 12 V | | 123.53 | 1.6808 |
| Decline 16 V | | 150.93 | 1.6808 |
| Incline 10 V | | 83.47 | 1.6808 |
| Incline 12 V | | 86.93 | 1.6808 |
| Incline 16 V | | 106.40 | 1.6808 |
| Level 10 V | | 97.07 | 1.6808 |

Numerous advantages accrue to the power closure panel performance optimizing systems and methods as described above. Because the system is applied to a counterbalanced power closure panel system, use of a smaller motor is made possible. By determining optimum electrical current draw for a power actuator system 108 according to environmental variables such as voltage, current, temperature and vehicle grade, component efficiency is maximized and useful lifespan of components such as motors, and also ancillary components such as cinching latches, cinching strikers, and attachment mountings, and their component life, etc. is optimized and therefore, increased to the benefit of the consumer and the producer. Moreover, the described systems and methods allow rapid deployment of software for controlling the power actuator system, and also much more rapid software design changes, updates, calibration/recalibration, and validation are more efficiently achieved.

Obvious modifications and variations are possible in light of the above teachings. All such modifications and variations are within the scope of the appended claims when interpreted in accordance with the breadth to which they are fairly, legally and equitably entitled.

What is claimed:

1. A power optimizer system for a closure panel, comprising:
   a closure panel power actuator system comprising at least a motor operatively connected to a vehicle closure panel, a spring-actuated power strut, and a counterbalancing member; and
   a closure panel power actuator system controller configured at least to determine an optimal electrical current draw for the power actuator system according to one or more inputs relating at least to a vehicle ambient temperature and grade.

2. The system of claim 1, wherein the motor is operatively connected to the spring-actuated power strut.

3. The system of claim 1, further including one or more sensors for providing the one or more inputs relating at least to the vehicle ambient temperature and grade.

4. The system of claim 3, wherein the one or more sensors are disposed in or on the vehicle and/or remotely to the vehicle.

5. The system of claim 1, wherein the controller is further configured to receive a vehicle battery voltage condition input prior to providing the determined optimum electrical current draw to the power actuator system motor.

6. The system of claim 1, wherein the counterbalancing member is one or more of a spring-actuated strut, a torsion bar, a torsion spring, and a gas/mechanical spring strut.

7. The system of claim 1, wherein the powered closure panel is one of a liftgate, a decklid, a tonneau cover, a door, a hood, a moving glass panel, and a tailgate.

8. A vehicle including the system of claim 1.

9. A method for optimizing electrical current draw of a power closure system for a vehicle, comprising:
   providing a closure panel power actuator system comprising at least a motor operatively connected to a vehicle closure panel, a spring-actuated power strut, and a counterbalancing member;
   providing a controller configured at least to determine an optimal electrical current draw for the power actuator system according to one or more inputs relating at least to a vehicle ambient temperature and grade; and
   by a module operatively associated with the controller, providing the determined optimum electrical current draw to the power actuator system motor.

10. The method of claim 9, further including providing the motor operatively connected to the spring-actuated power strut.

11. The method of claim 9, wherein the module is a panel power actuator system motor capable of pulse width modulation.

12. The method of claim 9, further including, by the controller, receiving a vehicle battery voltage determination input prior to the providing the optimum electrical current draw to the power actuator system motor.

13. The method of claim 9, including providing one or more sensors for providing the one or more inputs relating at least to a vehicle ambient temperature and grade.

14. The method of claim 13, including providing the one or more sensors disposed in and/or or on the vehicle and/or remotely to the vehicle.

15. The method of claim 9, including providing the counterbalancing member selected from the group consisting of a spring-actuated strut, a torsion bar, a torsion spring, and a gas/mechanical spring strut.

16. The system of claim 1, wherein the controller is operatively associate with a module configured to provide the determined optimum electrical current draw to the power actuator system motor by a pulse width modulator.

\* \* \* \* \*